(12) United States Patent
Baronne et al.

(10) Patent No.: US 11,586,443 B2
(45) Date of Patent: Feb. 21, 2023

(54) THREAD-BASED PROCESSOR HALTING

(71) Applicant: Micron Technology, Inc., Boise, ID (US)

(72) Inventors: Christopher Baronne, Allen, TX (US); Dean E. Walker, Allen, TX (US)

(73) Assignee: Micron Technology, Inc., Boise, ID (US)

( * ) Notice: Subject to any disclaimer, the term of this patent is extended or adjusted under 35 U.S.C. 154(b) by 92 days.

(21) Appl. No.: 17/074,730

(22) Filed: Oct. 20, 2020

(65) Prior Publication Data
US 2022/0121443 A1 Apr. 21, 2022

(51) Int. Cl.
*G06F 9/38* (2018.01)
*G06F 9/30* (2018.01)

(52) U.S. Cl.
CPC ........ *G06F 9/3851* (2013.01); *G06F 9/30101* (2013.01); *G06F 9/30189* (2013.01)

(58) Field of Classification Search
CPC ............... G06F 9/3851; G06F 9/30101; G06F 9/30189; G06F 9/3009; G06F 11/3024
USPC ........................................................ 712/227
See application file for complete search history.

(56) References Cited

U.S. PATENT DOCUMENTS

| | | | |
|---|---|---|---|
| 6,697,935 B1 * | 2/2004 | Borkenhagen | G06F 9/4843 712/228 |
| 8,156,307 B2 | 4/2012 | Wallach et al. | |
| 8,199,979 B2 | 6/2012 | Wallach et al. | |
| 8,205,066 B2 | 6/2012 | Brewer et al. | |
| 8,423,745 B1 | 4/2013 | Brewer | |
| 8,561,037 B2 | 10/2013 | Brewer et al. | |
| 9,710,384 B2 | 7/2017 | Wallach et al. | |
| 10,990,391 B2 | 4/2021 | Brewer | |
| 10,990,392 B2 | 4/2021 | Brewer | |
| 2005/0120194 A1 * | 6/2005 | Kissell | G06F 9/3009 712/242 |
| 2006/0004988 A1 * | 1/2006 | Jordan | G06F 9/3861 712/229 |
| 2006/0179280 A1 * | 8/2006 | Jensen | G06F 9/3851 712/E9.032 |
| 2008/0270708 A1 | 10/2008 | Warner et al. | |
| 2010/0015732 A1 * | 1/2010 | Bose | G06F 11/20 438/4 |
| 2012/0079177 A1 | 3/2012 | Brewer et al. | |
| 2013/0332711 A1 | 12/2013 | Leidel et al. | |
| 2014/0282607 A1 * | 9/2014 | O'Sullivan | G06F 11/30 718/108 |
| 2015/0143350 A1 | 5/2015 | Brewer | |
| 2015/0206561 A1 | 7/2015 | Brewer et al. | |
| 2019/0042214 A1 | 2/2019 | Brewer | |

(Continued)

FOREIGN PATENT DOCUMENTS

| | | |
|---|---|---|
| WO | 2010051167 | 5/2010 |
| WO | 2013184380 | 12/2013 |

(Continued)

*Primary Examiner* — Keith E Vicary
(74) *Attorney, Agent, or Firm* — Schwegman Lundberg & Woessner, P.A.

(57) ABSTRACT

Devices and techniques for thread-based processor halting are described herein. A processor monitors control-status register (CSR) values that correspond to a halt condition for a thread. The processor then compares the halt condition to a current state of the thread and halts in response to the current state of the thread meeting the halt condition.

30 Claims, 6 Drawing Sheets

(56) References Cited

U.S. PATENT DOCUMENTS

| | | |
|---|---|---|
| 2019/0171604 A1 | 6/2019 | Brewer |
| 2019/0243700 A1 | 8/2019 | Brewer |
| 2019/0303154 A1 | 10/2019 | Brewer |
| 2019/0324928 A1 | 10/2019 | Brewer |
| 2019/0340019 A1 | 11/2019 | Brewer |
| 2019/0340020 A1 | 11/2019 | Brewer |
| 2019/0340023 A1 | 11/2019 | Brewer |
| 2019/0340024 A1 | 11/2019 | Brewer |
| 2019/0340027 A1 | 11/2019 | Brewer |
| 2019/0340035 A1 | 11/2019 | Brewer |
| 2019/0340154 A1 | 11/2019 | Brewer |
| 2019/0340155 A1 | 11/2019 | Brewer |
| 2021/0055964 A1 | 2/2021 | Brewer |
| 2021/0064374 A1 | 3/2021 | Brewer |
| 2021/0064435 A1 | 3/2021 | Brewer |
| 2021/0149600 A1 | 5/2021 | Brewer |

FOREIGN PATENT DOCUMENTS

| | | |
|---|---|---|
| WO | 2019191740 | 10/2019 |
| WO | 2019191742 | 10/2019 |
| WO | 2019191744 | 10/2019 |
| WO | 2019217287 | 11/2019 |
| WO | 2019217295 | 11/2019 |
| WO | 2019217324 | 11/2019 |
| WO | 2019217326 | 11/2019 |
| WO | 2019217329 | 11/2019 |
| WO | 2019089816 | 4/2020 |

\* cited by examiner

THREAD-BASED PROCESSOR HALTING

BACKGROUND

Chiplets are an emerging technique for integrating various processing functionalities. Generally, a chiplet system is made up of discrete modules (each a "chiplet") that are integrated on an interposer, and in many examples interconnected as desired through one or more established networks, to provide a system with the desired functionality. The interposer and included chiplets can be packaged together to facilitate interconnection with other components of a larger system. Each chiplet can include one or more individual integrated circuits (ICs), or "chips", potentially in combination with discrete circuit components, and commonly coupled to a respective substrate to facilitate attachment to the interposer. Most or all chiplets in a system will be individually configured for communication through the one or more established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems can include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, a sensor interface chiplet, or a communication chiplet. In a typical use case, the synthetic vision designer can design the application chiplet and source the support chiplets from other parties. Thus, the design expenditure (e.g., in terms of time or complexity) is reduced by avoiding the design and production of functionality embodied in the support chiplets. Chiplets also support the tight integration of IP blocks that can otherwise be difficult, such as those manufactured using different processing technologies or using different feature sizes (or utilizing different contact technologies or spacings). Thus, multiple IC's or IC assemblies, with different physical, electrical, or communication characteristics can be assembled in a modular manner to provide an assembly providing desired functionalities. Chiplet systems can also facilitate adaptation to suit needs of different larger systems into which the chiplet system will be incorporated. In an example, IC's or other assemblies—e.g., sensors—can be optimized for the power, speed, or heat generation for a specific function and can be integrated with other devices more easily than attempting to do so on a single die. Additionally, by reducing the overall size of the die, the yield for chiplets tends to be higher than that of more complex, single die devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1A:
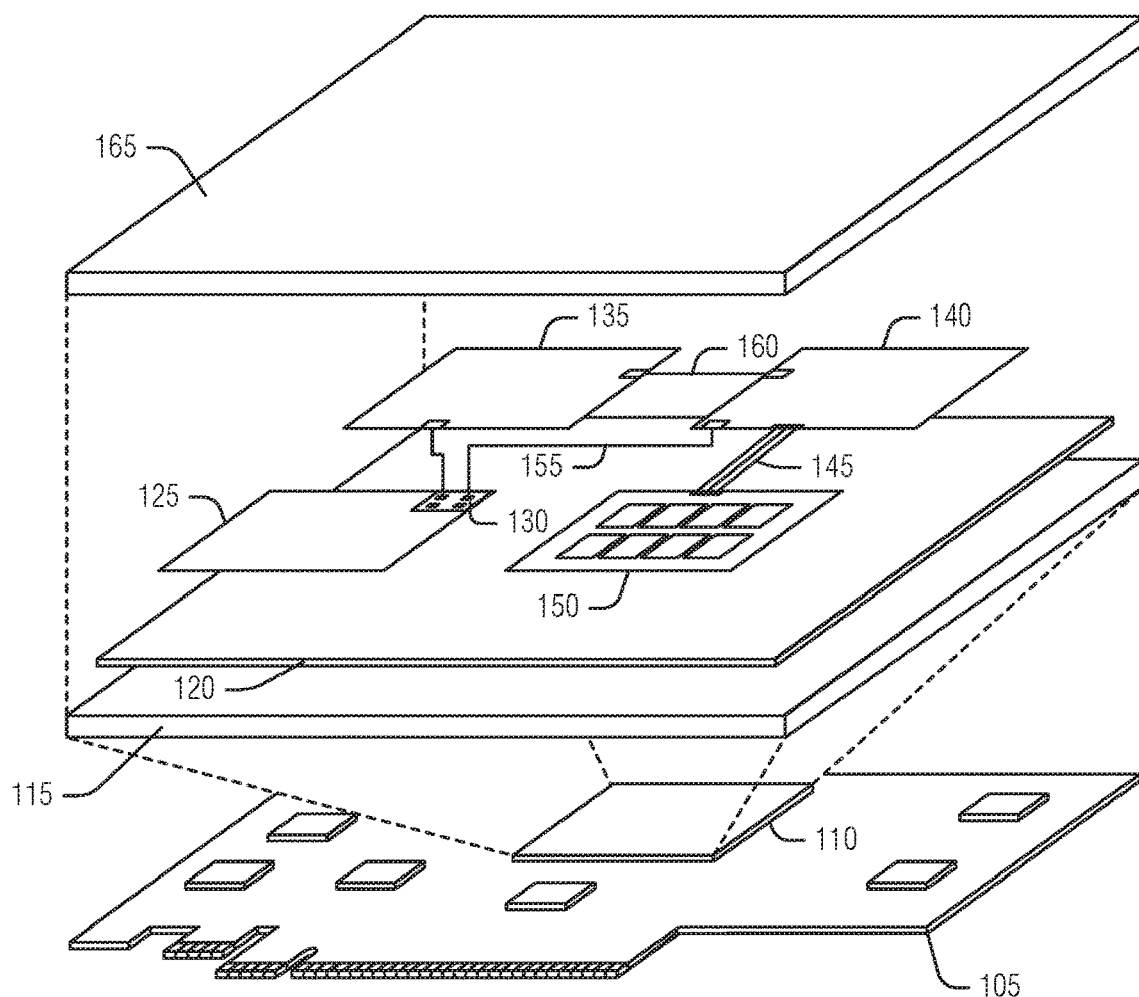
FIGS. 1A and 1B illustrate an example of a chiplet system, according to an embodiment.
Figure 1B:
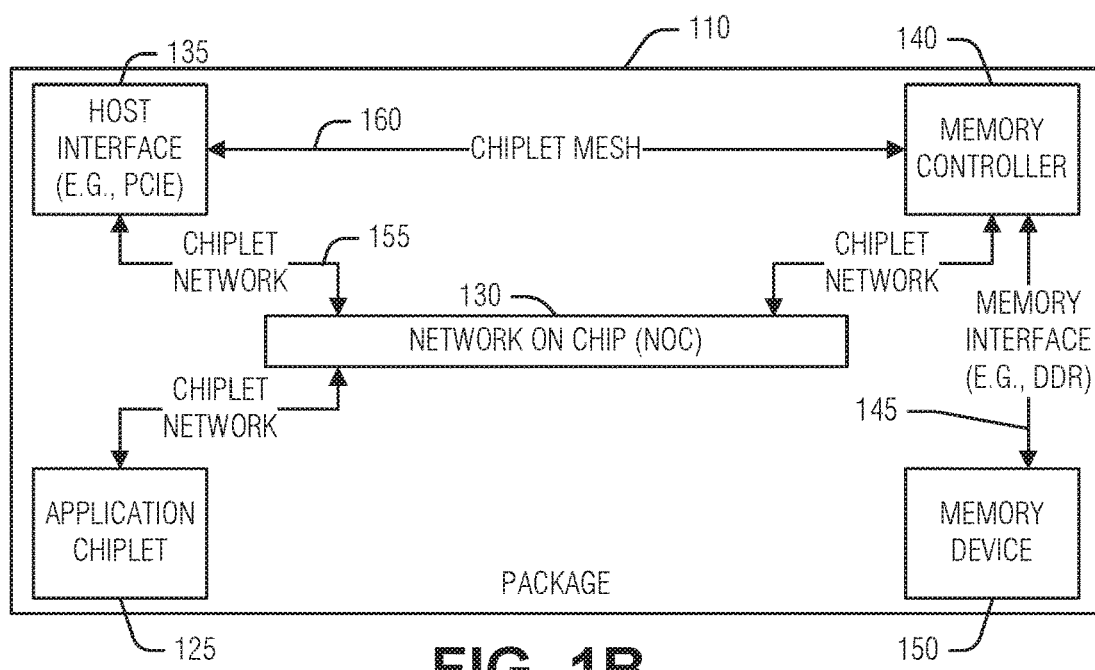

FIGS. 1A-1B, described below, offers offer an example of a chiplet system and the components operating therein. The illustrated chiplet system includes a memory controller. This memory controller includes a programmable atomic unit (PAU) to execute a custom program, a programmable atomic operator, in response to a memory request for the programmable atomic operator. Additional details about the PAU are described below with respect to FIGS. 2 and 3. The processor of the PAU can be barrel-multithreaded and pipelined. An issue can arise with such a processor executing a programmable atomic operator that involves debugging atomic operators during execution. Debugging within a processor is often difficult as state elements (e.g., registers, working memory, storage, etc.) are constantly in use by executing threads. Reading elements at any given moment may not be possible or may require expensive arbitration and stalling logic to accomplish. Breakpoint instructions can partially address this issue by halting the processor, giving an opportunity to read state elements of the processor. However, breakpoint instructions generally require a change to the software of the programmable atomic operator, the programmer (or compiler) inserting them into the code base prior to loading the programmable atomic operator on the PAU. Further, breakpoint instructions are additional instructions in the programmable atomic operator, and thus can change the behavior of the executing programmable atomic operator, possibly impacting debugging accuracy.

To address the issue of debugging programmable atomic operators executing on the PAU processor, a processor signaling mechanism to halt the processor is described herein. Control/status register (CSR) values (e.g., bits) of the PAU processor are used to signal conditions for a processor halt. When the conditions are met, the processor stops scheduling additional instructions, effectively halting the processor. At this point, the debugger can access state elements through CSR read operations to relevant state RAMs for performance or debugging purposes. Execution (e.g., scheduling) can resume upon setting a restart CSR indication (e.g., bit) in the processor. The halt conditions can include such things as identification of an executing thread and a number of previously executed instructions by the thread. Thus, for example, thread one can be identified and a number of previously executed instructions (4) set in the CSR. After four additional instructions of thread one are executed, then the processor halts.

In an example, the processor has dedicated CSR bits to hold an instruction execution count threshold and a dedicated bit to enable halting after the count condition is met. The processor can also include control circuitry related to the scheduler (e.g., surrounding the scheduler) to stall the scheduler (e.g., an arbiter stops supplying the scheduler from the schedule queues) when the condition is met. Thus, no further threads can be scheduled. In an example, an additional CSR bit is dedicated to re-enable the scheduler and resume execution CSR resume bit). In an example, the setting of the CSR bits (e.g., the halt and resume bits) can be chained (e.g., organized in sequence) to pause the scheduler again on a later instruction for the thread.

The CSR signaling mechanism to halt the scheduler simplifies debugging in a barrel-multithreaded processor. This mechanism is flexible while using minimal additional circuitry (e.g., logic) to implement, resulting in a compact and efficient solution. The ability to pause, restart, and pause again adds software debugger-like stepping ability within the processor. Such capability greatly increases visibility into program state to more easily discover an issue with a programmable atomic operator. By avoiding breakpoint instructions, users do not need to anticipate breakpoints in advance, and the programmable atomic operator instruction stream itself is not disturbed by debug. Additional details and examples are provided below.

FIGS. 1A and 1B illustrate an example of a chiplet system 110, according to an embodiment. FIG. 1A is a representation of the chiplet system 110 mounted on a peripheral board 105, that can be connected to a broader computer system by a peripheral component interconnect express (PCIe), for example. The chiplet system 110 includes a package substrate 115, an interposer 120, and four chiplets, an application chiplet 125, a host interface chiplet 135, a memory controller chiplet 140, and a memory device chiplet 150. Other systems can include many additional chiplets to provide additional functionalities as will be apparent from the following discussion. The package of the chiplet system 110 is illustrated with a lid or cover 165, though other packaging techniques and structures for the chiplet system can be used. FIG. 1B is a block diagram labeling the components in the chiplet system for clarity.

The application chiplet 125 is illustrated as including a network-on-chip (NOC) 130 to support a chiplet network 155 for inter-chiplet communications. In example embodiments NOC 130 can be included on the application chiplet 125. In an example, NOC 130 can be defined in response to selected support chiplets (e.g., chiplets 135, 140, and 150) thus enabling a designer to select an appropriate number or chiplet network connections or switches for the NOC 130. In an example, the NOC 130 can be located on a separate chiplet, or even within the interposer 120. In examples as discussed herein, the NOC 130 implements a chiplet protocol interface (CPI) network.

The CPI is a packet-based network that supports virtual channels to enable a flexible and high-speed interaction between chiplets. CPI enables bridging from intra-chiplet networks to the chiplet network 155. For example, the Advanced eXtensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 155.

CPI can use a variety of different physical layers to transmit packets. The physical layer can include simple conductive connections, or can include drivers to increase the voltage, or otherwise facilitate transmitting the signals over longer distances. An example of one such physical layer can include the Advanced Interface Bus (AIB), which in various examples, can be implemented in the interposer 120. AIB transmits and receives data using source synchronous data transfers with a forwarded clock. Packets are transferred across the AIB at single data rate (SDR) or dual data rate (DDR) with respect to the transmitted clock. Various channel widths are supported by AIB. AIB channel widths are in multiples of 20 bits when operated in SDR mode (20, 40, 60, . . . ), and multiples of 40 bits for DDR mode: (40, 80, 120, . . . ). The AIB channel width includes both transmit and receive signals. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB principal or subordinate depending on which chiplet provides the principal clock. AIB I/O cells support three clocking modes: asynchronous (i.e. non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half TX and half RX. CPI packet protocols can use an AIB channel in either SDR or DDR operation modes. In an example, the AIB channel is configured in increments of 80 I/O cells (i.e. 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware.

SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency can be utilized. CPI includes elements to minimize both latency and energy consumption in these ultra-short reach chiplet interconnects.

For flow control, CPI employs a credit-based technique. A recipient, such as the application chiplet 125, provides a sender, such as the memory controller chiplet 140, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender allow transmitting of additional information.

Also illustrated is a chiplet mesh network 160 that uses a direct, chiplet-to-chiplet technique without the need for the NOC 130. The chiplet mesh network 160 can be implemented in CPI, or another chiplet-to-chiplet protocol. The chiplet mesh network 160 generally enables a pipeline of chiplets where one chiplet serves as the interface to the pipeline while other chiplets in the pipeline interface only with themselves.

Additionally, dedicated device interfaces, such as one or more industry standard memory interfaces 145 (such as, for example, synchronous memory interfaces, such as DDR5, DDR6), can also be used to interconnect chiplets. Connection of a chiplet system or individual chiplets to external devices (such as a larger system can be through a desired interface (for example, a PCIE interface). Such as external interface can be implemented, in an example, through a host interface chiplet 135, which in the depicted example, provides a PCIE interface external to chiplet system 110. Such dedicated interfaces 145 are generally employed when a convention or standard in the industry has converged on such an interface. The illustrated example of a Double Data Rate (DDR) interface 145 connecting the memory controller chiplet 140 to a dynamic random access memory (DRAM) memory device 150 is just such an industry convention.

Of the variety of possible support chiplets, the memory controller chiplet 140 is likely present in the chiplet system 110 due to the near omnipresent use of storage for computer processing as well as sophisticated state-of-the-art for memory devices. Thus, using memory device chiplets 150 and memory controller chiplets 140 produced by others gives chiplet system designers access to robust products by sophisticated producers. Generally, the memory controller chiplet 140 provides a memory device specific interface to read, write, or erase data. Often, the memory controller chiplet 140 can provide additional features, such as error detection, error correction, maintenance operations, or atomic operator execution. For some types of memory, maintenance operations tend to be specific to the memory device 150, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh can be controlled by a host processor or of a memory controller at some times, and at other times controlled by the DRAM memory device, or by logic associated with one or more DRAM devices, such as an interface chip (in an example, a buffer).

Atomic operators are a data manipulation that, for example, can be performed by the memory controller chiplet 140. In other chiplet systems, the atomic operators can be performed by other chiplets. For example, an atomic operator of "increment" can be specified in a command by the application chiplet 125, the command including a memory address and possibly an increment value. Upon receiving the command, the memory controller chiplet 140 retrieves a number from the specified memory address, increments the number by the amount specified in the command, and stores the result. Upon a successful completion, the memory controller chiplet 140 provides an indication of the commands success to the application chiplet 125. Atomic operators avoid transmitting the data across the chiplet network 160, resulting in lower latency execution of such commands.

Atomic operators can be classified as built-in atomics or programmable (e.g., custom) atomics. Built-in atomics are a finite set of operations that are immutably implemented in hardware. Programmable atomics are small programs that can execute on a programmable atomic unit (PAU) (e.g., a custom atomic unit (CAU)) of the memory controller chiplet 140. FIGS. 1A-1B illustrate an example of a memory controller chiplet that discusses a PAU.

The memory device chiplet 150 can be, or include any combination of, volatile memory devices or non-volatile memories. Examples of volatile memory devices include, but are not limited to, random access memory (RAM)—such as DRAM—synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device 150 as a chiplet, however, the memory device 150 can reside elsewhere, such as in a different package on the peripheral board 105. For many applications, multiple memory device chiplets can be provided. In an example, these memory device chiplets can each implement one or multiple storage technologies. In an example, a memory chiplet can include multiple stacked memory die of different technologies, for example one or more static random access memory (SRAM) devices stacked or otherwise in communication with one or more dynamic random access memory (DRAM) devices. Memory controller 140 can also serve to coordinate operations between multiple memory chiplets in chiplet system 110; for example, to utilize one or more memory chiplets in one or more levels of cache storage, and to use one or more additional memory chiplets as main memory. Chiplet system 110 can also include multiple memory controllers 140, as can be used to provide memory control functionality for separate processors, sensors, networks, etc. A chiplet architecture, such as chiplet system 110 offers advantages in allowing adaptation to different memory storage technologies; and different memory interfaces, through updated chiplet configurations, without requiring redesign of the remainder of the system structure.

Figure 2:
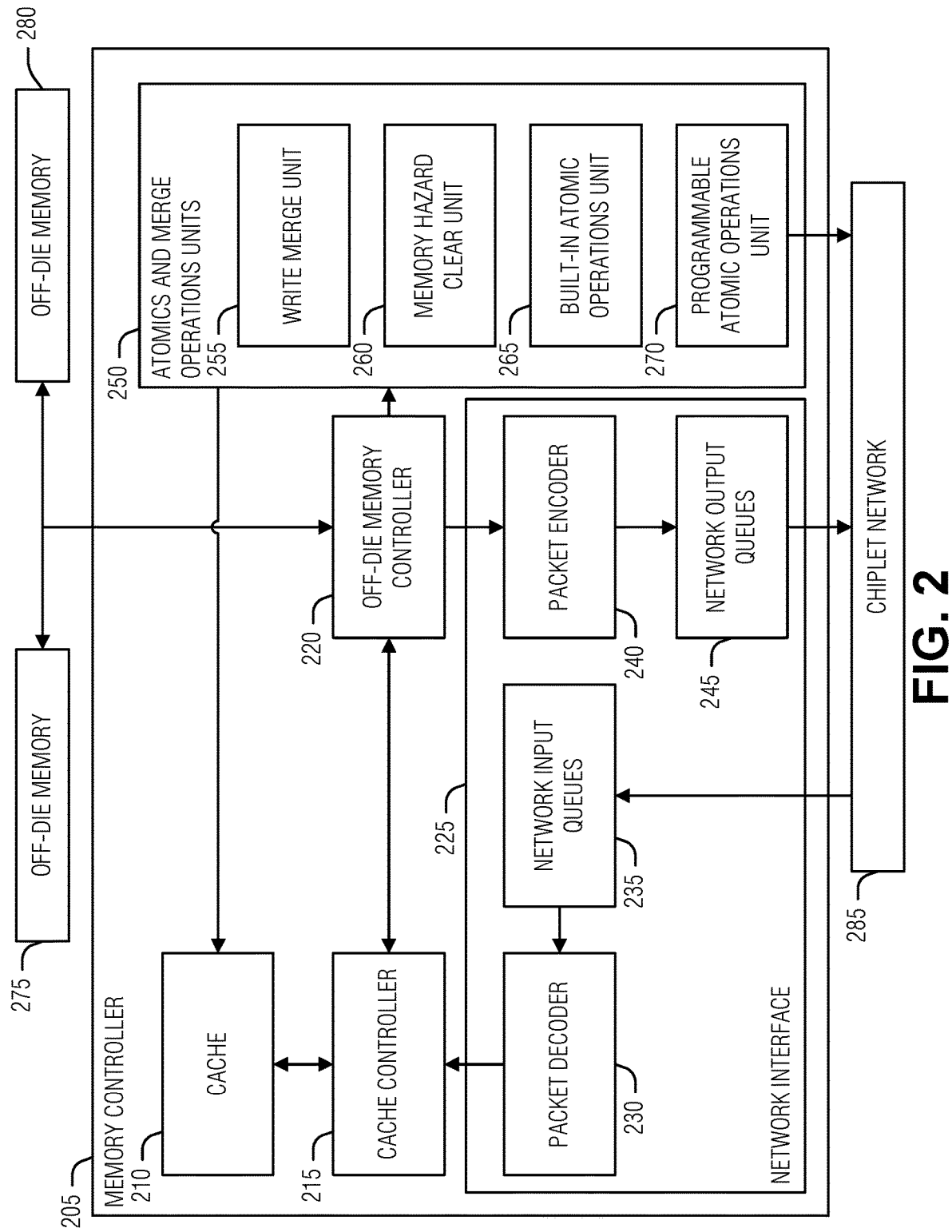
FIG. 2 illustrates components of an example of a memory controller chiplet, according to an embodiment.

FIG. 2 illustrates components of an example of a memory controller chiplet 205, according to an embodiment. The memory controller chiplet 205 includes a cache 210, a cache controller 215, an off-die memory controller 220 (e.g., to communicate with off-die memory 275), a network communication interface 225 (e.g., to interface with a chiplet network 285 and communicate with other chiplets), and a set of atomic and merge units 250. Members of this set can include, for example, a write merge unit 255, a memory hazard unit 260, built-in atomic unit 265, or a PAU 270. The various components are illustrated logically, and not as they necessarily would be implemented. For example, the built-in atomic unit 265 likely comprises different devices along a path to the off-die memory. For example, the built-in atomic unit 265 could be in an interface device/buffer on a memory chiplet, as discussed above. In contrast, the programmable atomic unit 270 could be implemented in a separate processor on the memory controller chiplet 205 (but in various examples can be implemented in other locations, for example on a memory chiplet).

The off-die memory controller 220 is directly coupled to the off-die memory 275 (e.g., via a bus or other communication connection) to provide write operations and read operations to and from the one or more off-die memory, such as off-die memory 275 and off-die memory 280. In the depicted example, the off-die memory controller 220 is also coupled for output to the atomic and merge unit 250, and for input to the cache controller 2:15 (e.g., a memory side cache controller).

In the example configuration, cache controller 215 is directly coupled to the cache 210, and can be coupled to the network communication interface 225 for input (such as incoming read or write requests), and coupled for output to the off-die memory controller 220.

The network communication interface 225 includes a packet decoder 230, network input queues 235, a packet encoder 240, and network output queues 245 to support a packet-based chiplet network 285, such as CPI. The chiplet network 285 can provide packet routing between and among processors, memory controllers, hybrid threading processors, configurable processing circuits, or communication interfaces. In such a packet-based communication system, each packet typically includes destination and source addressing, along with any data payload or instruction. In an example, the chiplet network 285 can be implemented as a collection of crossbar switches having a folded Clos configuration, or a mesh network providing for additional connections, depending upon the configuration.

In various examples, the chiplet network 285 can be part of an asynchronous switching fabric. Here, a data packet can be routed along any of various paths, such that the arrival of any selected data packet at an addressed destination can occur at any of multiple different times, depending upon the routing. Additionally, chiplet network 285 can be implemented at least in part as a synchronous communication network, such as a synchronous mesh communication network. Both configurations of communication networks are contemplated for use for examples in accordance with the present disclosure.

The memory controller chiplet 205 can receive a packet having, for example, a source address, a read request, and a physical address. In response, the off-die memory controller 220 or the cache controller 215 will read the data from the specified physical address (which can be in the off-die memory 275 or in the cache 210), and assemble a response packet to the source address containing the requested data. Similarly, the memory controller chiplet 205 can receive a packet having a source address, a write request, and a physical address. In response, the memory controller chiplet 205 will write the data to the specified physical address (which can be in the cache 2:10 or in the off-die memories 275 or 280), and assemble a response packet to the source address containing an acknowledgement that the data was stored to a memory.

Thus, the memory controller chiplet 205 can receive read and write requests via the chiplet network 285 and process the requests using the cache controller 215 interfacing with the cache 210, if possible. If the request cannot be handled by the cache controller 215, the off-die memory controller 220 handles the request by communication with the off-die memories 275 or 280, the atomic and merge unit 250, or both. As noted above, one or more levels of cache can also be implemented in off-die memories 275 or 280; and in some such examples can be accessed directly by cache controller 215. Data read by the off-die memory controller 220 can be cached in the cache 210 by the cache controller 215 for later use.

The atomic and merge unit 250 are coupled to receive (as input) the output of the off-die memory controller 220, and to provide output to the cache 210, the network communication interface 225, or directly to the chiplet network 285. The memory hazard unit 260, write merge unit 255 and the built-in (e.g., predetermined) atomic unit 265 can each be implemented as state machines with other combinational logic circuitry (such as adders, shifters, comparators, AND gates, OR gates, XOR gates, or any suitable combination thereof) or other logic circuitry. These components can also include one or more registers or buffers to store operand or other data. The PAU 270 can be implemented as one or more processor cores or control circuitry, and various state machines with other combinational logic circuitry or other logic circuitry, and can also include one or more registers, buffers, or memories to store addresses, executable instructions, operand and other data, or can be implemented as a processor.

The write merge unit 255 receives read data and request data, and merges the request data and read data to create a single unit having the read data and the source address to be used in the response or return data packet. The write merge unit 255 provides the merged data to the write port of the cache 210 (or, equivalently, to the cache controller 215 to write to the cache 210). Optionally, the write merge unit 255 provides the merged data to the network communication interface 225 to encode and prepare a response or return data packet for transmission on the chiplet network 285.

When the request data is for a built-in atomic operator, the built-in atomic unit 265 receives the request and reads data, either from the write merge unit 255 or directly from the off-die memory controller 220. The atomic operator is performed, and using the write merge unit 255, the resulting data is written to the cache 210, or provided to the network communication interface 225 to encode and prepare a response or return data packet for transmission on the chiplet network 285.

The built-in atomic unit 265 handles predefined atomic operators such as fetch-and-increment or compare-and-swap. In an example, these operations perform a simple read-modify-write operation to a single memory location of 32 bytes or less in size. Atomic memory operations are initiated from a request packet transmitted over the chiplet network 285. The request packet has a physical address, atomic operator type, operand size, and optionally up to 32 bytes of data. The atomic operator performs the read-modify-write to a cache memory line of the cache 210, filling the cache memory if necessary. The atomic operator response can be a simple completion response, or a response with up to 32 bytes of data. Example atomic memory operators include fetch-and-AND, fetch-and-OR, fetch-and-XOR, fetch-and-add, fetch-and-subtract, fetch-and-increment, fetch-and-decrement, fetch-and-minimum, fetch-and-maximum, fetch-and-swap, and compare-and-swap. In various example embodiments, 32-bit and 64-bit operations are supported, along with operations on 16 or 32 bytes of data. Methods disclosed herein are also compatible with hardware supporting larger or smaller operations and more or less data.

Built-in atomic operators can also involve requests for a "standard" atomic operator on the requested data, such as comparatively simple, single cycle, integer atomics—such as fetch-and-increment or compare-and-swap—which will occur with the same throughput as a regular memory read or write operation not involving an atomic operator. For these operations, the cache controller 215 can generally reserve a cache line in the cache 210 by setting a hazard bit (in hardware), so that the cache line cannot be read by another process while it is in transition. The data is obtained from either the off-die memory 275 or the cache 210, and is provided to the built-in atomic unit 265 to perform the requested atomic operator. Following the atomic operator, in addition to providing the resulting data to the packet encoder 240 to encode outgoing data packets for transmission on the chiplet network 285, the built-in atomic unit 265 provides the resulting data to the write merge unit 255, which will also write the resulting data to the cache 210. Following the writing of the resulting data to the cache 210, any corresponding hazard bit which was set will be cleared by the memory hazard unit 260.

The PAU 270 enables high performance (high throughput and low latency) for programmable atomic operators (also referred to as "custom atomic transactions" or "custom atomic operators"), comparable to the performance of built-in atomic operators. Rather than executing multiple memory accesses, in response to an atomic operator request designating a programmable atomic operator and a memory address, circuitry in the memory controller chiplet 205 transfers the atomic operator request to PAU 270 and sets a hazard bit stored in a memory hazard register corresponding to the memory address of the memory line used in the atomic operator, to ensure that no other operation (read, write, or atomic) is performed on that memory line, which hazard bit is then cleared upon completion of the atomic operator. Additional, direct data paths provided for the PAU 270 executing the programmable atomic operators allow for additional write operations without any limitations imposed by the bandwidth of the communication networks and without increasing any congestion of the communication networks.

The PAU 270 includes a multi-threaded processor, for example, such as a RISC-V ISA based multi-threaded processor, having one or more processor cores, and further having an extended instruction set for executing programmable atomic operators. When provided with the extended instruction set for executing programmable atomic operators, the PAU 270 can be embodied as one or more hybrid threading processors. In some example embodiments, the PAU 270 provides barrel-style, round-robin instantaneous thread switching to maintain a high instruction-per-clock rate.

Programmable atomic operators can be performed by the PAU 270 involving requests for a programmable atomic operator on the requested data. A user can prepare programming code to provide such programmable atomic operators. For example, the programmable atomic operators can be comparatively simple, multi-cycle operations such as floating-point addition, or comparatively complex, multi-instruction operations such as a Bloom filter insert. The programmable atomic operators can be the same as or different than the predetermined atomic operators, insofar as they are defined by the user rather than a system vendor. For these operations, the cache controller 215 can reserve a cache line in the cache 210, by setting a hazard bit (in hardware), so that cache line cannot be read by another process while it is in transition. The data is obtained from either the cache 210 or the off-die memories 275 or 280, and is provided to the PAU 270 to perform the requested programmable atomic operator. Following the atomic operator, the PAU 270 will provide the resulting data to the network communication interface 225 to directly encode outgoing data packets having the resulting data for transmission on the chiplet network 285. In addition, the PAU 270 will provide the resulting data to the cache controller 215, which will also write the resulting data to the cache 210. Following the writing of the resulting data to the cache 210, any corresponding hazard bit which was set will be cleared by the cache control circuit 215.

In selected examples, the approach taken for programmable atomic operators is to provide multiple, generic, custom atomic request types that can be sent through the chiplet network 285 to the memory controller chiplet 205 from an originating source such as a processor or other system component. The cache controller 215 or off-die memory controller 220 identify the request as a custom atomic and forward the request to the PAU 270. In a representative embodiment, the PAU 270: (1) is a programmable processing element capable of efficiently performing a user defined atomic operator; (2) can perform load and stores to memory, arithmetic and logical operations and control flow decisions; and (3) leverages the RISC-V ISA with a set of new, specialized instructions to facilitate interacting with such controllers 215, 220 to atomically perform the user-defined operation. In desirable examples, the RISC-V ISA contains a full set of instructions that support high level language operators and data types. The PAU 270 can leverage the RISC-V ISA, but will commonly support a more limited set of instructions and limited register file size to reduce the die size of the unit when included within the memory controller chiplet 205.

As mentioned above, prior to the writing of the read data to the cache 210, the set hazard bit for the reserved cache line is to be cleared, by the memory hazard clear unit 260. Accordingly, when the request and read data is received by the write merge unit 255, a reset or clear signal can be transmitted by the memory hazard clear unit 260 to the cache 210 to reset the set memory hazard bit for the reserved cache line. Also, resetting this hazard bit will also release a pending read or write request involving the designated (or reserved) cache line, providing the pending read or write request to an inbound request multiplexer for selection and processing.

Figure 3:
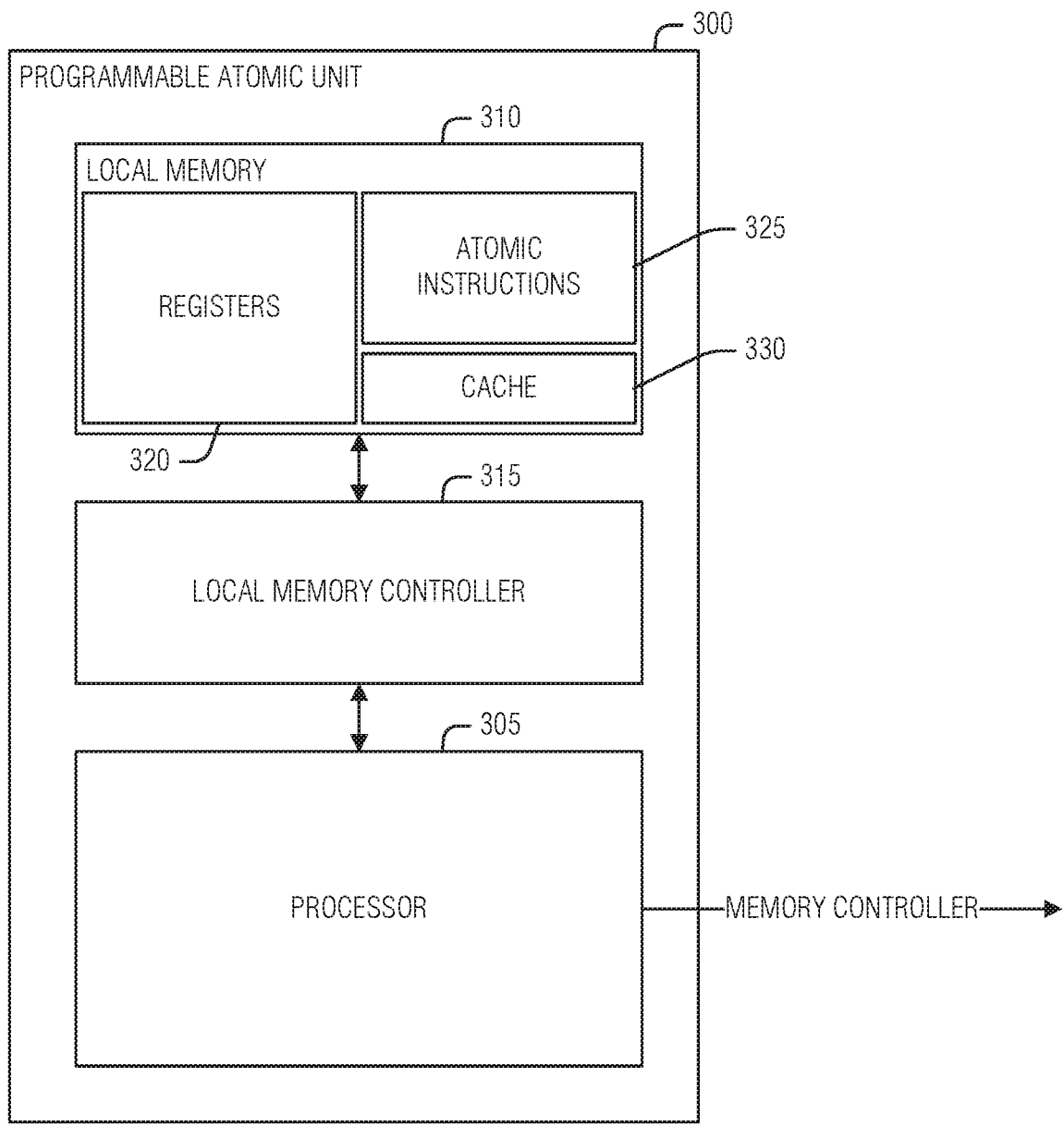
FIG. 3 illustrates components in an example of a programmable atomic unit (PAU), according to an embodiment.

FIG. 3 illustrates components in an example of a programmable atomic unit 300 (PAU), such as those noted above with respect to FIG. 1 (e.g., in the memory controller 140) and FIG. 2 (e.g., PAU 270), according to an embodiment. As illustrated, the PAU 300 includes a processor 305, local memory 310 (e.g., SRAM), and a controller 315 for the local memory 310.

In an example, the processor 305 is a pipeline such that multiple stages of different instructions are executed together per clock cycle. The processor 305 is also a barrel-multithreaded processor, with circuitry to switch between different register files (e.g., sets of registers containing current processing state) upon each clock cycle of the processor 305. This enables efficient context switching between currently executing threads. In an example, the processor 305 supports eight threads, resulting in eight register files. In an example, some or all of the register files are not integrated into the processor 305, but rather reside in the local memory 310 (registers 320). This reduces circuit complexity in the processor 305 by eliminating the traditional flip-flops used for these registers 320.

The local memory 310 can also house a cache 330 and instructions 325 for atomic operators. The atomic instructions 325 comprise sets of instructions to support the various application-loaded atomic operators. When an atomic operator is requested—by the application chiplet 125, for example—a set of instructions corresponding to the atomic operator are executed by the processor 305. In an example, the atomic instructions 325 are partitioned to establish the sets of instructions. In this example, the specific programmable atomic operator being requested by a requesting process can identify the programmable atomic operator by the partition number. The partition number can be established when the programmable atomic operator is registered with (e.g., loaded onto) the PAU 300. Additional metadata for the programmable atomic instructions 325 can also be stored in the local memory 310, such as the partition tables.

Atomic operators manipulate the cache 330, which is generally synchronized (e.g., flushed) when a thread for an atomic operator completes. Thus, aside from initial loading from the external memory, such as the off-die memory 275 or 280, latency is reduced for most memory operations during execution of a programmable atomic operator thread.

The issue of debugging flexibility can be resolved by pause circuitry (e.g., logic) in the processor 305. Here, the processor 305 includes CSR storage (e.g., flip-flop registers, registers in the local memory 310, etc.). The pause circuitry is configured to monitor CSR values of a processor. The monitoring includes CSR values that correspond to a halt condition for a thread. In an example, the CSR values include a thread identifier (ID), or other technique to identify to which thread the halt condition applies. In an example, a current thread, when the CSR values for the halt condition are set, is the thread to which the halt condition applies. The setting of the CSR values is accomplished through any myriad of techniques, such as through a serial peripheral interface (SPI) to the processor 305—for example, initiated by an application chiplet, to the memory controller, to the PAU 300, to the processor 305. Other debugging technologies, such as a Joint Test Action Group (JTAG) bus can be used.

The halt condition is some value that the pause circuitry can compare against a current thread state to assess whether to halt the processor 305. In an example, the halt condition is a number of instructions executed by the thread. In an example, the number of instructions is an absolute value, counting from a first instruction of the thread. In an example, the number of instructions is an absolute value, counting from the start of a programmable atomic operator.

The pause circuitry is configured to compare the halt condition to a current state of the thread. The current state of the thread can be obtained, for example, from an instruction fetch or instruction decode stage of the processor 310 pipeline. The comparison can be performed by a bitwise AND operation between the halt condition bits from the CSR values and an output from the pipeline. In this example, when the AND returns with all bits at a logical one, the condition is met. Numerical values can be assessed in an at-least fashion, such that the halt condition can be met when the current thread state meets or exceeds the halt condition. Here, the pause circuitry performs the comparison to determine whether, for example, the current executed instruction count for the thread is greater than or equal to the halt condition in the CSR values.

The pause circuitry is configured to halt the processor 305 in response to the current state of the thread meeting the halt condition. Thus, once the comparison comes back positive, the processor 305 is stopped. In an example, the CSR values include a halt flag. Here, the pause circuitry only stops the processor if both the halt flag is set (e.g., present) and the halt condition is met. The addition of the halt flag enables the halt condition to be used without being reset. Thus, for example, if a debugger wanted to step through the instructions four at a time, the halt flag can be set and unset, incrementing the halt condition by four before each restart. Further, using the halt flag can ensure additional safety in the debugging process by enabling a debugger to set the halt condition, and check that the set halt condition is correct, before setting the halt flag to start the debugging.

In an example, to halt the processor 305, the pause circuitry is configured to prevent a scheduler of the processor 305 from scheduling additional thread instructions. There are several ways in which the scheduler can be prevented from scheduling additional threads. For example, the pause circuitry can be integrated into the scheduler, and put the scheduler into an idle state. In an example, the pause circuitry signals an arbiter of scheduling queues to cease providing threads to the scheduler to prevent the scheduler from scheduling additional threads. By eliminating the delivery of threads to the scheduler, the scheduler defaults to its normal idle state and the processor 305 effectively halts.

In an example, the pause circuitry is configured to monitor a resume flag in the CSR values and resume thread execution in response to the resume flag being set. Here, the resume flag can be the same CSR value as the halt flag. If the flag is a single bit, then a logical zero can correspond to the resume flag and a logical one can correspond to the halt flag. However, there can be advantages to having a separate resume flag in the CSR values. For example, during normal operation, neither the halt flag nor the resume flag is set. The halt condition can be set, but if the halt flag is not, normal processor 305 operation continues. When the halt flag is set, the debugging commences. To step through, for example, by two instructions, a thread, the resume flag can be toggled while leaving the halt flag set.

In an example, to resume thread execution, the pause circuitry is configured to start the thread scheduler again. Thus, if the scheduling queue arbiter is prevented from delivering a next thread to the scheduler, then the pause circuitry signals the arbiter to resume delivering threads from the scheduling queues.

Once the processor is halted, state data can be read by the debugger. In an example, the processor 305 is configured to receive a read request for a state memory (e.g., register value) and provide data from the state memory in response to the read request. In an example, the read request is in the form of additional CSR values being set. Here, the CSR is used to signal the request, and to store the results of the request. The debugger uses the CSR setting and getting technology, such as a JTAG bus, to perform these operations.

Figure 4:
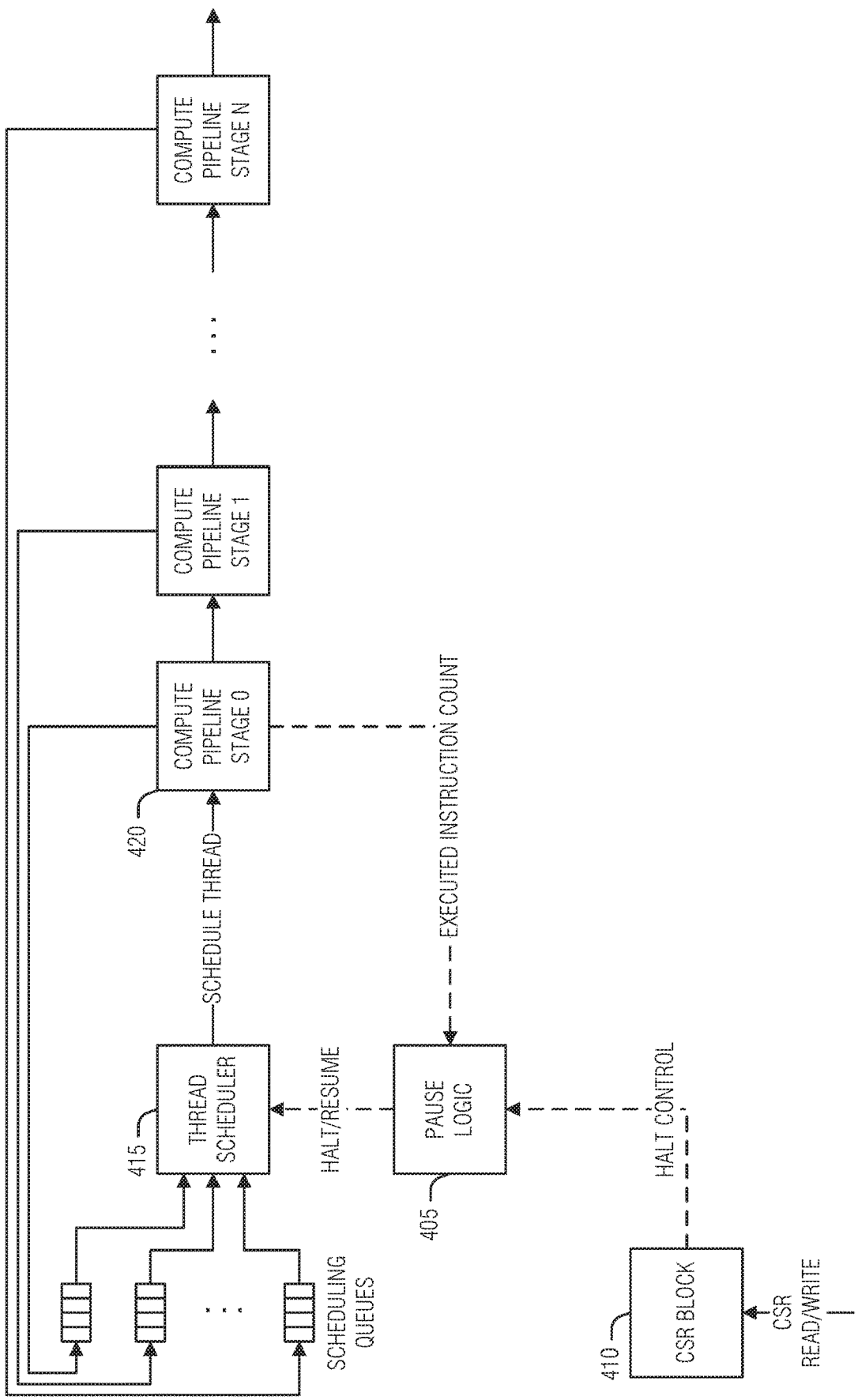
FIG. 4 illustrates a processing flow through processor components for thread-based processor halting, according to an embodiment.

FIG. 4 illustrates a processing flow through processor components—e.g., for the processor 305—for thread-based processor halting, according to an embodiment. The illustrated processor components include a CSR block 410 to hold CSR values, a thread scheduler 415, and several pipeline stages, such as pipeline stage zero—which is typically an instruction fetch stage. The processor components also include pause circuitry 405, communicatively coupled to the CSR block 410, the processor pipeline, and the thread scheduler 415 when in operation as illustrated by the dashed lines. Although illustrated as a separate component, the pause circuitry 405 can be included in the thread scheduler 415, an arbiter of the thread scheduler (not shown), the compute pipeline, or elsewhere.

As noted above with respect to FIG. 3, the pause circuitry 405 monitors CSR values in the CSR block 410 to ascertain, for example, a halt condition and whether a halt or resume flag are set. The pause circuitry receives, for example, a current thread state from the first stage 420 (stage zero) of the processor pipeline and compares this state to the halt condition. If the halt condition is met and, in some examples, if the halt flag is set, the pause circuitry 405 signals the scheduler 415 to stop scheduling additional threads.

The devices and techniques for halting the processor described herein simplifies the task of debugging in a barrel-multithreaded processor while adding flexibility at a minimal cost of added logic. The ability to pause, restart, and pause a thread again adds software debugger-like stepping capabilities within the processor. This greatly increases visibility into thread execution state to more easily discover or resolve an issue. By accomplishing this functionality without adding breakpoint instructions, programmers do not need to anticipate breakpoints in advance, and the programmable atomic operator instruction stream itself is not disturbed by the debugging.

Figure 5:
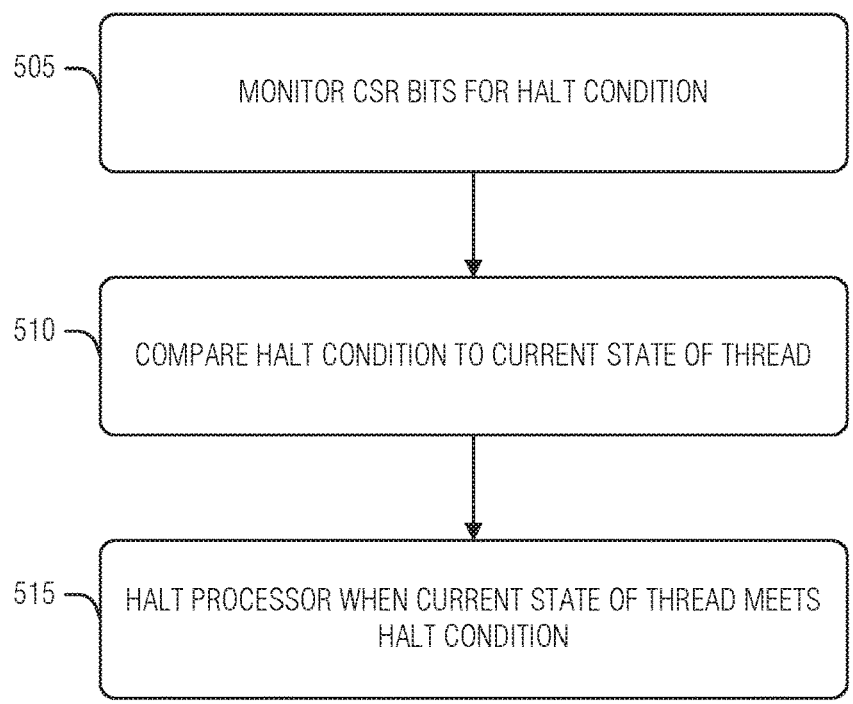
FIG. 5 is a flow chart of an example of a method for thread-based processor halting according to an embodiment.

FIG. 5 is a flow chart of an example of a method 500 for thread-based processor halting according to an embodiment. Operations of the method 500 are performed by computer hardware (e.g., processing circuitry).

In an example, the method is performed by a processor (e.g., the processor 305) in a PAU (e.g., PAU 300 or PAU 270) in a memory controller (e.g., memory controller 140 or memory controller 205). In an example, the memory controller is a chiplet (e.g., memory controller 140). In an example, the memory controller chiplet is integrated into a chiplet system (e.g., chiplet system 110).

At operation 505, a control-status register (CSR) values (e.g., bits) of a processor are monitored. Here, at least one of the CSR values corresponds to a halt condition for a thread. In an example, the CSR values include a thread identifier (ID). In an example, the halt condition is a number of instructions executed by the thread. In an example, the number of instructions is an absolute value, counting from a first instruction of the thread.

At operation 510, the halt condition is compared to a current state of the thread. In an example, the current state of the thread meets the halt condition when a count of executed thread instructions meets or exceeds the number of instructions defined by the halt condition.

At operation 515, halting the processor in response to the current state of the thread meeting the halt condition. In an example, the CSR values include a halt flag. In an example, the processor is halted only if the halt condition is met and the halt flag is also set in the CSR values.

In an example, halting the processor includes preventing a scheduler of the processor from scheduling additional thread instructions. In an example, an arbiter of scheduling queues ceases providing threads to the scheduler to prevent the scheduler from scheduling additional thread instructions.

In an example, the method 500 can include the additional operations of receiving a read request for a state memory and providing data from the state memory in response to the read request. In an example, the read request is in the form of additional CSR values being set.

In an example, the method 500 can include the additional operations of monitoring a resume flag in the CSR values, the resume flag corresponding to resumption of the processor. Here, the processor resumes thread execution in response to the resume flag being set.

Figure 6:
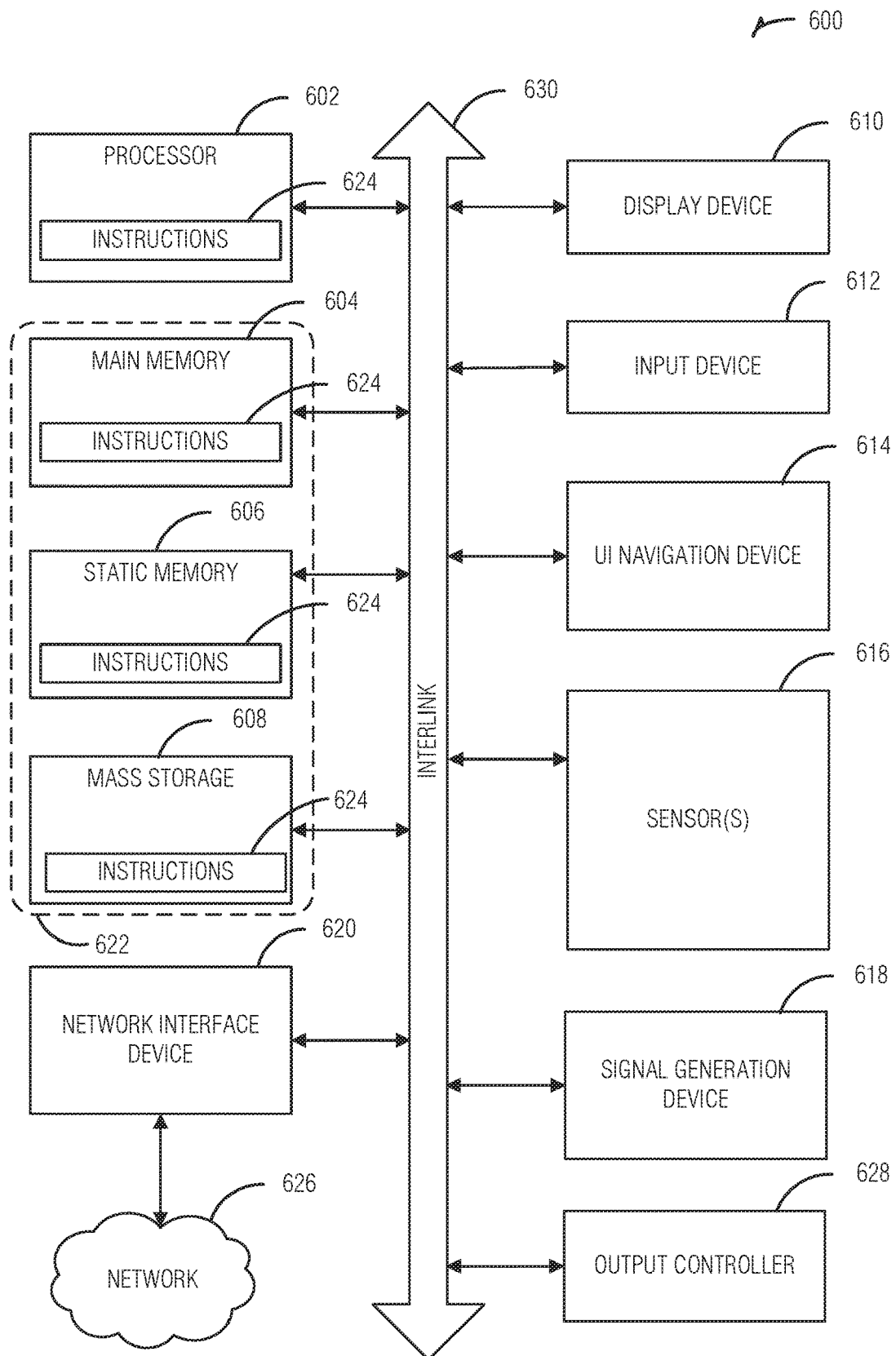
FIG. 6 is a block diagram of an example of a machine with which, in which, or by which embodiments of the present disclosure can operate.

FIG. 6 illustrates a block diagram of an example machine 600 with which, in which, or by which any one or more of the techniques (e.g., methodologies) discussed herein can be implemented. Examples, as described herein, can include, or can operate by, logic or a number of components, or mechanisms in the machine 600. Circuitry (e.g., processing circuitry) is a collection of circuits implemented in tangible entities of the machine 600 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 600 follow.

In alternative embodiments, the machine 600 can operate as a standalone device or can be connected (e.g., networked) to other machines. In a networked deployment, the machine 600 can operate in the capacity of a server machine, a client machine, or both in server-client network environments. In an example, the machine 600 can act as a peer machine in peer-to-peer (P2P) (or other distributed) network environment. The machine 600 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 600 can include a hardware processor 602 (e.g., a central processing unit (CPU), a graphics processing unit (GPU), a hardware processor core, or any combination thereof), a main memory 604, a static memory (e.g., memory or storage for firmware, microcode, a basic-input-output (BIOS), unified extensible firmware interface (UEFI), etc.) 606, and mass storage 608 (e.g., hard drives, tape drives, flash storage, or other block devices) some or all of which can communicate with each other via an interlink (e.g., bus) 630. The machine 600 can further include a display unit 610, an input device 612 (e.g., an alphanumeric input device such as a keyboard), and a user interface (UI) navigation device 614 (e.g., a mouse). In an example, the display unit 610, input device 612 and UI navigation device 614 can be a touch screen display. The machine 600 can additionally include a storage device (e.g., drive unit) such as mass storage 608, a signal generation device 618 (e.g., a speaker), a network interface device 620, and one or more sensors 616, such as a global positioning system (GPS) sensor, compass, accelerometer, or other sensor. The machine 600 can include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 602, the main memory 604, the static memory 606, or the mass storage 608 can be, or include, a machine readable medium 622 on which is stored one or more sets of data structures or instructions 624 (e.g., software) embodying or utilized by any one or more of the techniques or functions described herein. The instructions 624 can also reside, completely or at least partially, within any of registers of the processor 602, the main memory 604, the static memory 606, or the mass storage 608 during execution thereof by the machine 600. In an example, one or any combination of the hardware processor 602, the main memory 604, the static memory 606, or the mass storage 608 can constitute the machine readable media 622. While the machine readable medium 622 is illustrated as a single medium, the term "machine readable medium" can include a single medium or multiple media (e.g., a centralized or distributed database, or associated caches and servers) configured to store the one or more instructions 624.

The term "machine readable medium" can include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EPROM)) and flash memory devices; magnetic disks, such as internal hard disks and removable disks; magneto-optical disks; and CD-ROM and DVD-ROM disks.

In an example, information stored or otherwise provided on the machine readable medium 622 can be representative of the instructions 624, such as instructions 624 themselves or a format from which the instructions 624 can be derived. This format from which the instructions 624 can be derived can include source code, encoded instructions (e.g., in compressed or encrypted form), packaged instructions (e.g., split into multiple packages), or the like. The information representative of the instructions 624 in the machine readable medium 622 can be processed by processing circuitry into the instructions to implement any of the operations discussed herein. For example, deriving the instructions 624 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 624.

In an example, the derivation of the instructions 624 can include assembly, compilation, or interpretation of the information (e.g., by the processing circuitry) to create the instructions 624 from some intermediate or preprocessed format provided by the machine readable medium 622. The information, when provided in multiple parts, can be combined, unpacked, and modified to create the instructions 624. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 624 can be further transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 can include one or more physical jacks (e.g., Ethernet, coaxial, or phone jacks) or one or more antennas to connect to the communications network 626. In an example, the network interface device 620 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software. A transmission medium is a machine readable medium. To better illustrate the methods and apparatuses described herein, a non-limiting set of Example embodiments are set forth below as numerically identified Examples.

Example 1 is an apparatus comprising: a control-status register (CSR) block configured to hold CSR values; pause circuitry configured to: monitor the control-status register (CSR) values corresponding to a halt condition for a thread; compare the halt condition to a current state of the thread; and signal the apparatus to halt in response to the current state of the thread meeting the halt condition.

In Example 2, the subject matter of Example 1, wherein the CSR values include an identifier for the thread.

In Example 3, the subject matter of any of Examples 1-2, wherein the halt condition is a number of instructions executed by the thread.

In Example 4, the subject matter of Example 3, wherein the number of instructions is an absolute number, counting from the first instruction of the thread.

In Example 5, the subject matter of any of Examples 3-4, wherein the current state of the thread meets the halt condition when a count of executed thread instructions meets or exceeds the number of instructions defined by the halt condition.

In Example 6, the subject matter of any of Examples 1-5, wherein the CSR values include a halt flag, and wherein the apparatus is only signaled to halt in response to both the halt condition being met and the halt flag being set in the CSR values.

In Example 7, the subject matter of any of Examples 1-6, comprising a scheduler, wherein the signal to halt the apparatus includes preventing the scheduler from scheduling additional thread instructions.

In Example 8, the subject matter of Example 7, comprising: scheduling queues; and an arbiter configured to transfer threads from the scheduling queues to the scheduler, wherein the arbiter ceases providing threads to the scheduler in response to the signal to halt the apparatus to prevent the scheduler from scheduling additional thread instructions.

In Example 9, the subject matter of any of Examples 1-8, wherein the pause circuitry is configured to: receive a read request for a state memory; and provide data from the state memory in response to the read request.

In Example 10, the subject matter of Example 9, wherein the read request is in the form of additional CSR values being set.

In Example 11, the subject matter of any of Examples 1-10, wherein the pause circuitry is configured to: monitor a resume flag in the CSR values, the resume flag corresponding to resumption of the apparatus; and resume the apparatus in response to the resume flag being set.

In Example 12, the subject matter of any of Examples 1-11, wherein the apparatus is included in a programmable atomic unit (PAU) of a memory controller.

In Example 13, the subject matter of Example 12, wherein the memory controller is a chiplet in a chiplet system.

Example 14 is a method comprising: monitoring, by a processor, control-status register (CSR) values of the processor, the CSR values corresponding to a halt condition for a thread; comparing, by the processor, the halt condition to a current state of the thread; and halting the processor in response to the current state of the thread meeting the halt condition.

In Example 15, the subject matter of Example 14, wherein the CSR values include an identifier for the thread.

In Example 16, the subject matter of any of Examples 14-15, wherein the halt condition is a number of instructions executed by the thread.

In Example 17, the subject matter of Example 16, wherein the number of instructions is an absolute number, counting from the first instruction of the thread.

In Example 18, the subject matter of any of Examples 16-17, wherein the current state of the thread meets the halt condition when a count of executed thread instructions meets or exceeds the number of instructions defined by the halt condition.

In Example 19, the subject matter of any of Examples 14-18, wherein the CSR values include a halt flag, and wherein the processor is only halted in response to both the halt condition being met and the halt flag being set in the CSR values.

In Example 20, the subject matter of any of Examples 14-19, wherein halting the processor includes preventing a scheduler of the processor from scheduling additional thread instructions.

In Example 21, the subject matter of Example 20, wherein an arbiter of scheduling queues ceases providing threads to the scheduler to prevent the scheduler from scheduling additional thread instructions.

In Example 22, the subject matter of any of Examples 14-21, comprising: receiving a read request for a state memory; and providing data from the state memory in response to the read request.

In Example 23, the subject matter of Example 22, wherein the read request is in the form of additional CSR values being set.

In Example 24, the subject matter of any of Examples 14-23, comprising: monitoring a resume flag in the CSR values, the resume flag corresponding to resumption of the processor; and resuming the processor in response to the resume flag being set.

In Example 25, the subject matter of any of Examples 14-24, wherein the processor is included in a programmable atomic unit (PAU) of a memory controller.

In Example 26, the subject matter of Example 25, wherein the memory controller is a chiplet in a chiplet system.

Example 27 is a machine-readable medium including instructions that, when executed by circuitry of a processor, cause the processor to perform operations comprising: monitoring control-status register (CSR) values of the processor, the CSR values corresponding to a halt condition for a thread; comparing the halt condition to a current state of the thread; and halting the processor in response to the current state of the thread meeting the halt condition.

In Example 28, the subject matter of Example 27, wherein the CSR values include an identifier for the thread.

In Example 29, the subject matter of any of Examples 27-28, wherein the halt condition is a number of instructions executed by the thread.

In Example 30, the subject matter of Example 29, wherein the number of instructions is an absolute number, counting from the first instruction of the thread.

In Example 31, the subject matter of any of Examples 29-30, wherein the current state of the thread meets the halt condition when a count of executed thread instructions meets or exceeds the number of instructions defined by the halt condition.

In Example 32, the subject matter of any of Examples 27-31, wherein the CSR values include a halt flag, and wherein the processor is only halted in response to both the halt condition being met and the halt flag being set in the CSR values.

In Example 33, the subject matter of any of Examples 27-32, wherein halting the processor includes preventing a scheduler of the processor from scheduling additional thread instructions.

In Example 34, the subject matter of Example 33, wherein an arbiter of scheduling queues ceases providing threads to the scheduler to prevent the scheduler from scheduling additional thread instructions.

In Example 35, the subject matter of any of Examples 27-34, wherein the operations comprise: receiving a read request for a state memory; and providing data from the state memory in response to the read request.

In Example 36, the subject matter of Example 35, wherein the read request is in the form of additional CSR values being set.

In Example 37, the subject matter of any of Examples 27-36, wherein the operations comprise: monitoring a resume flag in the CSR values, the resume flag corresponding to resumption of the processor; and resuming the processor in response to the resume flag being set.

In Example 38, the subject matter of any of Examples 27-37, wherein the processor is included in a programmable atomic unit (PAU) of a memory controller.

In Example 39, the subject matter of Example 38, wherein the memory controller is a chiplet in a chiplet system.

Example 40 is a system comprising: means for monitoring control-status register (CSR) values of a processor, the CSR values corresponding to a halt condition for a thread; means for comparing the halt condition to a current state of the thread; and halting the processor in response to the current state of the thread meeting the halt condition.

In Example 41, the subject matter of Example 40, wherein the CSR values include an identifier for the thread.

In Example 42, the subject matter of any of Examples 40-41, wherein the halt condition is a number of instructions executed by the thread.

In Example 43, the subject matter of Example 42, wherein the number of instructions is an absolute number, counting from the first instruction of the thread.

In Example 44, the subject matter of any of Examples 42-43, wherein the current state of the thread meets the halt condition when a count of executed thread instructions meets or exceeds the number of instructions defined by the halt condition.

In Example 45, the subject matter of any of Examples 40-44, wherein the CSR values include a halt flag, and wherein the processor is only halted in response to both the halt condition being met and the halt flag being set in the CSR values.

In Example 46, the subject matter of any of Examples 40-45, wherein the means for halting the processor includes means for preventing a scheduler of the processor from scheduling additional thread instructions.

In Example 47, the subject matter of Example 46, wherein an arbiter of scheduling queues ceases providing threads to the scheduler to prevent the scheduler from scheduling additional thread instructions.

In Example 48, the subject matter of any of Examples 40-47, comprising: means for receiving a read request for a state memory; and means for providing data from the state memory in response to the read request.

In Example 49, the subject matter of Example 48, wherein the read request is in the form of additional CSR values being set.

In Example 50, the subject matter of any of Examples 40-49, comprising: means for monitoring a resume flag in the CSR values, the resume flag corresponding to resumption of the processor; and means for resuming the processor in response to the resume flag being set.

In Example 51, the subject matter of any of Examples 40-50, wherein the processor is included in a programmable atomic unit (PAU) of a memory controller.

In Example 52, the subject matter of Example 51, wherein the memory controller is a chiplet in a chiplet system.

Example 53 is a chiplet system comprising: a memory; and a memory controller chiplet couplable to the memory and including a processor, the processor comprising: a control-status register (CSR) block configured to hold CSR values; pause circuitry configured to: monitor the control-status register (CSR) values corresponding to a halt condition for a thread; compare the halt condition to a current state of the thread; and signal the processor to halt in response to the current state of the thread meeting the halt condition.

In Example 54, the subject matter of Example 53, wherein the CSR values include an identifier for the thread.

In Example 55, the subject matter of any of Examples 53-54, wherein the halt condition is a number of instructions executed by the thread.

In Example 56, the subject matter of Example 55, wherein the number of instructions is an absolute number, counting from the first instruction of the thread.

In Example 57, the subject matter of any of Examples 55-56, wherein the current state of the thread meets the halt condition when a count of executed thread instructions meets or exceeds the number of instructions defined by the halt condition.

In Example 58, the subject matter of any of Examples 53-57, wherein the CSR values include a halt flag, and wherein the processor is only signaled to halt in response to both the halt condition being met and the halt flag being set in the CSR values.

In Example 59, the subject matter of any of Examples 53-58, comprising a scheduler, wherein the signal to halt the processor includes preventing the scheduler from scheduling additional thread instructions.

In Example 60, the subject matter of Example 59, wherein the processor comprises: scheduling queues; and an arbiter configured to transfer threads from the scheduling queues to the scheduler, wherein the arbiter ceases providing threads to the scheduler in response to the signal to halt the processor to prevent the scheduler from scheduling additional thread instructions.

In Example 61, the subject matter of any of Examples 53-60, wherein the pause circuitry is configured to: receive a read request for a state memory; and provide data from the state memory in response to the read request.

In Example 62, the subject matter of Example 61, wherein the read request is in the form of additional CSR values being set.

In Example 63, the subject matter of any of Examples 53-62, wherein the pause circuitry is configured to: monitor a resume flag in the CSR values, the resume flag corresponding to resumption of the processor; and resume the processor in response to the resume flag being set.

In Example 64, the subject matter of any of Examples 53-63, wherein the apparatus is included in a programmable atomic unit (PAU) of the memory controller.

Example 65 is at least one machine-readable medium including instructions that, when executed by processing circuitry, cause the processing circuitry to perform operations to implement of any of Examples 1-64.

Example 66 is an apparatus comprising means to implement of any of Examples 1-64.

Example 67 is a system to implement of any of Examples 1-64.

Example 68 is a method to implement of any of Examples 1-64.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus comprising:
control-status registers (CSRs) configured to hold CSR values; and
pause circuitry configured to:
monitor the CSR values for a halt condition for a thread;
compare the halt condition to a current state of the thread; and
signal the apparatus to halt in response to the current state of the thread meeting the halt condition, wherein, while the apparatus is halted, the apparatus does not execute instructions for the thread and any additional threads.

2. The apparatus of claim 1, wherein the CSR values include an identifier for the thread.

3. The apparatus of claim 1, wherein the halt condition is a number of instructions executed by the thread.

4. The apparatus of claim 3, wherein the current state of the thread meets the halt condition when a count of executed thread instructions meets or exceeds the number of instructions defined by the halt condition.

5. The apparatus of claim 1, wherein the CSR values include a halt flag, and wherein the apparatus is only signaled to halt in response to both the halt condition being met and the halt flag being set in the CSR values.

6. The apparatus of claim 1, comprising a scheduler, wherein to signal the apparatus to halt, the pause circuitry provides a signal to prevent the scheduler from scheduling the instructions for the thread and any additional threads.

7. The apparatus of claim 6, comprising:
scheduling queues; and
an arbiter configured to transfer threads from the scheduling queues to the scheduler, wherein the arbiter ceases providing the threads to the scheduler in response to the signal to prevent the scheduler from scheduling the instructions for the thread and any additional threads.

8. The apparatus of claim 1, wherein the pause circuitry is configured to:
receive a read request for a state memory; and
provide data from the state memory in response to the read request.

9. The apparatus of claim 8, wherein the read request is in additional CSR values being set.

10. The apparatus of claim 1, wherein the pause circuitry is configured to:
monitor a resume flag in the CSR values, the resume flag corresponding to resumption of the apparatus; and
resume the apparatus in response to the resume flag being set.

11. A method comprising:
monitoring, by a processor, control-status register (CSR) values of the processor, the CSR values for a halt condition for a thread;
comparing, by the processor, the halt condition to a current state of the thread; and
halting the processor in response to the current state of the thread meeting the halt condition, wherein, while the processor is halted, the processor does not execute instructions for the thread and any additional threads.

12. The method of claim 11, wherein the CSR values include an identifier for the thread.

13. The method of claim 11, wherein the halt condition is a number of instructions executed by the thread.

14. The method of claim 13, wherein the current state of the thread meets the halt condition when a count of executed thread instructions meets or exceeds the number of instructions defined by the halt condition.

15. The method of claim 11, wherein the CSR values include a halt flag, and wherein the processor is only halted in response to both the halt condition being met and the halt flag being set in the CSR values.

16. The method of claim 11, wherein halting the processor includes preventing a scheduler of the processor from scheduling the instructions for the thread and any additional threads.

17. The method of claim 16, wherein an arbiter of scheduling queues ceases providing threads to the scheduler to prevent the scheduler from scheduling the instructions for the thread and any additional threads.

18. The method of claim 11, comprising:
receiving a read request for a state memory; and
providing data from the state memory in response to the read request.

19. The method of claim 18, wherein the read request is in additional CSR values being set.

20. The method of claim 11, comprising:
monitoring a resume flag in the CSR values, the resume flag corresponding to resumption of the processor; and
resuming the processor in response to the resume flag being set.

21. A chiplet system comprising:
a memory; and
a memory controller chiplet couplable to the memory and including a processor, the processor comprising:
control-status registers (CSRs) configured to hold CSR values; and
pause circuitry configured to:
monitor the CSR values for a halt condition for a thread;
compare the halt condition to a current state of the thread; and
signal the processor to halt in response to the current state of the thread meeting the halt condition, wherein, while the processor is halted, the processor does not execute instructions for the thread and any additional threads.

22. The chiplet system of claim 21, wherein the CSR values include an identifier for the thread.

23. The chiplet system of claim 21, wherein the halt condition is a number of instructions executed by the thread.

24. The chiplet system of claim 23, wherein the current state of the thread meets the halt condition when a count of executed thread instructions meets or exceeds the number of instructions defined by the halt condition.

25. The chiplet system of claim 21, wherein the CSR values include a halt flag, and wherein the processor is only signaled to halt in response to both the halt condition being met and the halt flag being set in the CSR values.

26. The chiplet system of claim 21, comprising a scheduler, wherein to signal the processor to halt, the pause circuitry provides a signal to prevent the scheduler from scheduling the instructions for the thread and any additional threads.

27. The chiplet system of claim 26, wherein the processor comprises:
scheduling queues; and
an arbiter configured to transfer threads from the scheduling queues to the scheduler, wherein the arbiter ceases providing the threads to the scheduler in response to the signal to prevent the scheduler from scheduling the instructions for the thread and any additional threads.

28. The chiplet system of claim 21, wherein the pause circuitry is configured to:
receive a read request for a state memory; and
provide data from the state memory in response to the read request.

29. The chiplet system of claim 28, wherein the read request is in additional CSR values being set.

30. The chiplet system of claim 21, wherein the pause circuitry is configured to:
monitor a resume flag in the CSR values, the resume flag corresponding to resumption of the processor; and
resume the processor in response to the resume flag being set.

* * * * *